May 30, 1939.　　　J. M. PEARSON　　　2,160,671

ELECTRICAL MEASURING METHOD AND MEANS

Filed June 22, 1937

WITNESS:

INVENTOR

John M. Pearson

BY

ATTORNEYS.

Patented May 30, 1939

2,160,671

UNITED STATES PATENT OFFICE 2,160,671

ELECTRICAL MEASURING METHOD AND MEANS

John M. Pearson, Swarthmore, Pa., assignor to Sun Oil Company, Philadelphia, Pa., a corporation of New Jersey Application June 22, 1937, Serial No. 149,648

6 Claims. (Cl. 175—183)

This invention relates to a method and means for the solution of problems arising in connection with the electrolytic destruction of buried conductors such as, for example, pipe lines.

Electrolytic destruction of underground pipe lines or other conduits or structures is usually in large measure due to the presence in the vicinity of other conducting structures either buried in or making electrical contact with the earth. Destructive electrolysis of underground conductors of elongated form, such as pipe lines, sheathed cables or the like, can be avoided by various known methods such as the provision of conductive bonds between structures or by breaking the electrical continuity of one or more structures so as to substantially change the electrical configuration of the layout. The layouts involved, however, are frequently so complicated that without considerable knowledge of the entire electrical configuration it is impossible to make any good estimates of the effect of a particular proposed change in structure designed to avoid the electrolysis. In cases where a complete knowledge of the configuration is not had it is quite likely that an attempt at solution of the problem may result in a local solution, but at the same time set up even more destructive electrolysis at some other point. The practical problem is, of course, particularly involved because of the diverse ownership of the various structures which may be taking part in the electrolysis. Obviously the owner of one structure, seeking to avoid electrolysis, must persuade the owners of the other structures that his proposed solution will not result in damage to their structures.

With the above general objects in view, I have proposed various methods and apparatus, described in my applications Serial Nos. 9,906 and 9,907, filed March 7, 1935, and 93,141, filed July 29, 1936. These various methods are preferably used in conjunction with each other as determined by the particular physical layout of the configurations and the particular problems to be solved.

One problem which arises fairly frequently is that of determining which of a number of conductive structures in the vicinity of some particular structure is primarily responsible for electrolytic destruction of the latter. This problem arises, for example, where a pipe line or the like may pass transversely a number of other elongated structures more or less closely related to each other and which, from preliminary considerations, might well be equally at fault in producing the results to be corrected. Such a case may arise, for example, where one structure, such as a pipe line or sheathed cable, may extend beneath a highway or series of parallel highways or streets, which may variously contain railways, sheathed cables, pipes or similar structures. If the latter structures run approximately parallel to each other and are of a highly conductive nature, little of value can be ascertained merely by measurements of potentials existing between the transverse structure and the various parallel ones. The parallelism of the latter makes their potentials approximately the same even though, as a matter of fact, one may be many times more responsible for destructive electrolysis than the others.

It is the object of the present invention to provide a method and apparatus for ascertaining the responsibility of structures such as those just outlined for current flow of destructive nature. While the invention is particularly applicable to structures of transverse configurations, it will be obvious that it is more generally applicable to other configurations which may depart quite substantially from the type just mentioned. In general it may be said that the invention relates to the easy and accurate determination of certain constants, characteristic of configurations, which enter into equations which must be solved to obtain a useful estimate of the problems involved so as to lead to their solutions. The general and more specific objects of the invention will become apparent from the following description read in conjunction with the accompanying drawing, in which:

Figure 1:
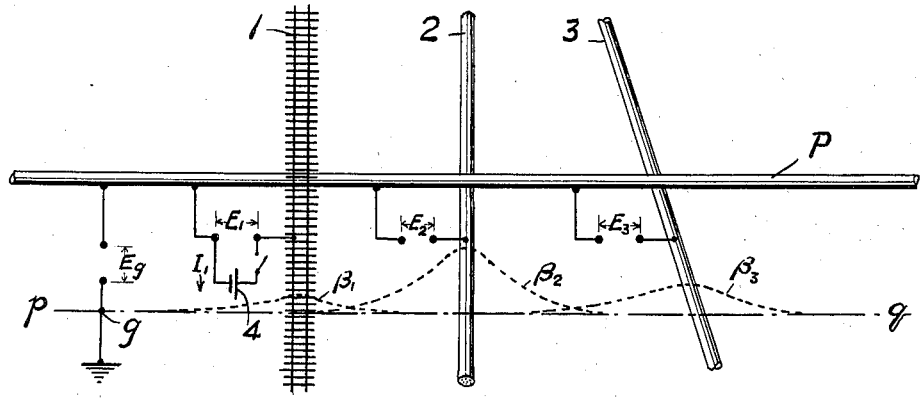
Figure 1 is a diagrammatic plan view of a typical configuration to which the invention is applicable.

Referring first to Figure 1, there is illustrated therein a configuration of crossing elongated conductors which may be assumed to be responsible for some damaging electrolytic conditions. At 1, 2 and 3 there are illustrated, respectively, a railway track, the sections of which may be bonded together and in electrical contact with the ground, a sheathed cable, and a metalic pipe. These three structures may be more or less parallel, as would be the case, for example, if they were extending along a street or highway or a number of adjacent streets or highways. Extending transversely of these structures there is shown a pipe line P which may, for example, be the victim of destructive electrolysis due to the buried or grounded conductors extending across it. The electrolysis may be occurring throughout a considerable length of the pipe P extending beneath all of the crossing structures and there may well be no indication from the electrolysis itself which of the structures is absorbing the current which is flowing from the pipe into the earth. Measurements of potential between the structures 1, 2 and 3 and the pipe P may give substantially the same values (and probably would do so if the structures were adjacent each other for any considerable distances), from which values no legitimate deductions could be made as to the path of the flowing current. Of course, the problem would be the same if the current were flowing from one of the structures 1, 2 or 3 to the pipe P, in which case, the electrolysis might occur in one of the former and it would not be possible to ascertain whether the pipe P or one of the other parallel structures was primarily responsible.

A system of this type is generally very closely linear and consequently the problems involved are generally considerably simplified by the possibility of basing the calculations on an assumption of linearity. Under this assumption the characteristics of a configuration such as that shown in Figure 1 may be comparatively simply expressed. For example, let $E_1$, $E_2$ and $E_3$ be, respectively, the potentials existing between the structures 1, 2 and 3 and the conductor P, and let $E_g$ be the potential existing between some point $g$ on the ground in the vicinity of the conductor P and the conductor. (In the systematic procedure hereinafter described, a series of points $g$ will be taken along a line $pq$ parallel to the conductor P, but spaced substantially distant therefrom, of the order, for example, of one or more times the spacings of the transverse structures from the conductor P). The following expression will then hold, in general, for $n$ structures such as 1, 2 and 3:

$$E_g = \alpha + \beta_1 E_1 + \beta_2 E_2 + \ldots \beta_x E_x + \ldots \beta_n E_n$$

In this equation $\alpha$ and the $\beta$'s will be constants. $\alpha$ should represent the galvanic potential between the ground rod at $g$ and the conductor P. If $\alpha$ in this equation is not a constant with time that means that some structures which should have been taken into account were not taken into account and that the equation should be extended by an additional term or terms taking into account the potentials of such other structures. This is a valuable check on the completeness of the determinations. It may be remarked that the potentials are, of course, those of a direct or slowly varying nature and do not relate to alternating currents which may be flowing. Since direct current instruments are used for measurement, commercial alternating currents and potentials superimposed on the direct or slowly varying currents or potentials will not enter into the picture.

From the above equation it will be obvious that to any point $g$ there corresponds a set of $\beta$'s individually related more or less closely to the various structures. If the point $g$ is taken at a substantial distance away from the structures corresponding values will probably be small. On the other hand, if the point $g$ is taken, for example, adjacent the structure 1, the value of $\beta_1$ will generally be found to rise, while the other $\beta$'s may still be small. If the values of the $\beta$'s are plotted for various positions of $g$ as ordinates against the line $pq$ as an axis of abscissas for various positions of $g$ along that axis, the various $\beta$'s may give curves as indicated in Figure 1, generally rising to maxima in the vicinity of their corresponding structures. The relative values of these maxima provide a good indication of the relative contributions of the various structures to the electrolysis of a structure extending along the line of the points $g$. Of course, interpretations must be made with a more general knowledge of the properties of the configurations; but one important step in approaching the solution of the problem is the determinaiton of these curves of the values of the $\beta$'s. The present invention primarily relates to the ready determination of the $\beta$'s for various positions of $g$. It may be remarked that a $\beta$ curve for only one structure in addition to that being surveyed is useful in many cases since its shape may be informative of electrical conditions existing in the configuration.

The values of the various E's in the above equation will depend not only upon stray currents but upon currents which may be made to artificially flow in conductors connecting the various structures together as, for example, a current $I_1$ which may be produced by a battery 4 connected in a conductor joining the track 1 and the pipe P. Similar currents may be introduced between the pipe P and the other structures. The effects of such currents, segregated from the effects of stray currents, may be readily expressed by the partial differentiation of the above equation with respect to the values of the currents so introduced. Thus we can write:

$$\frac{\partial E_g}{\partial I_1} = \beta_1 \frac{\partial E_1}{\partial I_1} + \beta_2 \frac{\partial E_2}{\partial I_1} + \cdots \beta_x \frac{\partial E_x}{\partial I_1} + \cdots \beta_n \frac{\partial E_n}{\partial I_1}$$

$$\vdots \qquad \vdots \qquad \vdots \qquad \vdots \qquad \vdots$$

$$\frac{\partial E_g}{\partial I_x} = \beta_1 \frac{\partial E_1}{\partial I_x} + \beta_2 \frac{\partial E_2}{\partial I_x} + \cdots \beta_x \frac{\partial E_x}{\partial I_x} + \cdots \beta_n \frac{\partial E_n}{\partial I_x}$$

$$\vdots \qquad \vdots \qquad \vdots \qquad \vdots \qquad \vdots$$

$$\frac{\partial E_g}{\partial I_n} = \beta_1 \frac{\partial E_1}{\partial I_n} + \beta_2 \frac{\partial E_2}{\partial I_n} + \cdots \beta_x \frac{\partial E_x}{\partial I_n} + \cdots \beta_n \frac{\partial E_n}{\partial I_n}$$

$$\vdots \qquad \vdots \qquad \vdots \qquad \vdots \qquad \vdots$$

According to usual conventions, $$\frac{\partial E_a}{\partial I_b}$$

would be considered a coupling resistance $R_{ab}$, while $$\frac{\partial E_a}{\partial I_a}$$

would be considered an internal resistance of the equivalent meshes of the system. From the reciprocity theorem, $R_{ab} = R_{ba}$.

The $n$ equations thus obtained may theoretically be solved for the $\beta$'s, each set giving the values of the $\beta$'s for a particular point $g$. However, the partial differential coefficients, representing changes in potentials due to changes in artificially introduced currents, are very difficult to ascertain because values of potentials and currents would have to be simultaneously measured and, due to changes in currents existing in the system, it is extremely difficult to determine corresponding changes of these values. The operation of electrical railways, for example, or earth currents commonly existing in the crust of the earth, will interfere very substantially with such measurements, and the best that may be done by direct measurement is to read repeatedly changes in potentials simultaneously with changes in currents and average the ratios.

The object of the invention may now be more specifically stated as involving the determination of the $\beta$'s without the necessity for measuring the partial differential coefficients, but rather by the use of a null method of measurement which may be carried out without interference by the varying currents in the earth. The result is to secure in one simple determination what would be arrived at only through many repetitions of the procedure mentioned above. The improved procedure arises from the following considerations:

Dividing the successive equations by $$\frac{\partial E_1}{\partial I_1}, \frac{\partial E_2}{\partial I_2}, \ldots \frac{\partial E_n}{\partial I_n}$$

respectively, and writing $$\frac{\frac{\partial E_a}{\partial I_b}}{\frac{\partial E_b}{\partial I_b}} = \frac{R_{ab}}{R_{bb}} = \gamma_{ab}$$

we obtain, since $\gamma_{aa} \equiv 1$:

$$\gamma_{o1} = \beta_1 + \beta_2\gamma_{21} + \cdots \beta_x\gamma_{x1} + \cdots \beta_n\gamma_{n1}$$
$$\vdots \quad \vdots \quad \vdots \quad \vdots \quad \vdots$$
$$\gamma_{ox} = \beta_1\gamma_{1x} + \beta_2\gamma_{2x} + \cdots \beta_x + \cdots \beta_n\gamma_{nx}$$
$$\vdots \quad \vdots \quad \vdots \quad \vdots \quad \vdots$$
$$\gamma_{on} = \beta_1\gamma_{1n} + \beta_2\gamma_{2n} + \cdots \beta_x\gamma_{xn} + \cdots \beta_n$$

The above equations may be readily solved for $\beta_1, \beta_2, \ldots \beta_n$, provided the values of the $\gamma$'s are known. The $\gamma$'s may be readily determined in the following fashion without interference by varying currents in the configuration.

Figure 2:
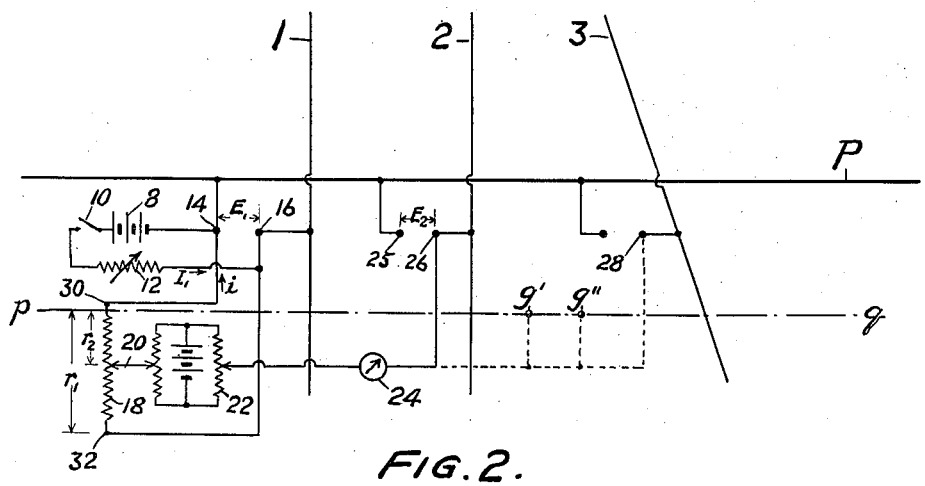
Figure 2 is a diagrammatic view of the same configuration showing the use of the improved measuring apparatus for obtaining information relative thereto.
Figure 3:
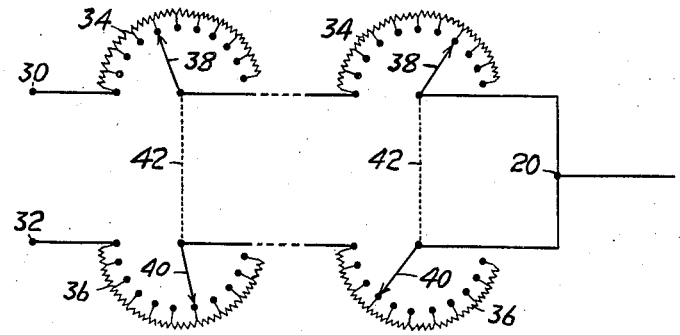
Figure 3 is a diagram showing the preferred form of constant resistance voltage divider used for the rapid making of measurements.

Referring to Figure 2, the configuration of Figure 1 is represented with the addition of certain measuring apparatus comprising a battery 8, switch 10 and current limiting resistance 12, connected between the terminals 14 and 16 joined, respectively, to the pipe P and the structure 1. Shunted across the terminals 14 and 16 is a fixed resistance 18 of a voltage divider having, in effect, a variable contact indicated at 20. In Figure 3 there is shown the preferred form of this voltage divider having two arms between the terminal 20 and the terminals 30 and 32, which are also illustrated in Figure 2. Each of these arms comprises a set of tapped resistances, indicated at 34 and 36, the taps being contacted by arms 38 and 40 which are mechanically connected as indicated at 42, so that as one adds resistance at 34 the other will subtract an equal amount of resistance at 36. The sets of resistances (desirably at least four in each arm so that results may be read to four significant figures) are preferably arranged in the usual decade fashion, with the result that any values may be chosen by adjustment of the arms of one branch of the divider while nevertheless the total resistance between 30 and 32 will remain constant.

The variable point 20 is connected through a galvanometer 24 to a terminal 26 connected to the structure 2. Interposed in series in this line there is preferably a voltage adjustor, as indicated at 22, for the purpose of balancing out any large direct stray currents and so causing the galvanometer needle to remain at or near zero position when balance is obtained. Preferably, the galvanometer is provided with a multiplying network of the type illustrated, for example, in my application Serial No. 9,907, referred to above, to avoid damage to the galvanometer during preliminary adjustments. The galvanometer may be an ordinary electrolysis voltmeter having its needle slightly less than critically damped.

With the setup as illustrated, and assuming a balance such that the galvanometer indicates zero or some constant value for a steady state condition with the battery 8 in and out of the circuit, the current $i$ flowing through the resistance 18 to the terminal 14 will be proportional to the current $I_1$ due to the battery and possibly (though this is wholy unimportant) to some other sources. Even if some slight current is flowing through the galvanometer this will be negligible compared to I and may be balanced out substantially completely by adjustment of 22. A steady state condition has been referred to for the reading of the galvanometer, because, in view of the varying inductances and capacities which are present in the configuration, it is likely that the galvanometer needle will be kicked to one side or the other whenever the current flow is interrupted or renewed. The reading to determine a zero or constant condition, as indicated above, must be made after a slight interval following the making or breaking of the current circuit to enable the needle to come to rest. In general, repeated readings to determine the null adjustment should be made to avoid any possible errors due to slowly varying direct currents in the configuration due to sources other than the source 8.

As a consequence of the above null adjustment we can write (if $E_1'$ and $E_2'$ are the portions of $E_1$ and $E_2$ due to stray currents and independent of $I_1$):

$$E_1 = r_1 i = K r_1 I_1 + E_1'$$
$$E_2 = r_2 i = K r_2 I_1 + E_2'$$

whence:

$$\frac{\partial E_1}{\partial I_1} = K r_1 \text{ and } \frac{\partial E_2}{\partial I_1} = K r_2,$$

so that:

$$\frac{\frac{\partial E_2}{\partial I_1}}{\frac{\partial E_1}{\partial I_1}} = \frac{r_2}{r_1} = \gamma_{21} = \frac{R_{21}}{R_{11}}$$

By making the connection of the galvanometer to 28 rather than to 26 it will be obvious that in precisely similar fashion the valve of $\gamma_{31}$ will be obtained. Likewise, the values of $\gamma_{g1}$ for any positions $g$, such as $g'$ and $g''$ may be obtained by connecting the galvanometer to such points of the line $pq$.

Similar determinations of the other $\gamma$'s are obtained by shifting the apparatus from terminals 14 and 16 to terminals 25 and 26, etc. In this systematic fashion, the various $\gamma$'s are obtained for the right hand side of the above equations and also for the left hand side of the various sets for different positions $g$. It will be noted that the right hand sides remain the same for the different positions $g$.

The constants thus having been obtained simultaneously, the $n$ equations for each position $g$ may be solved to give the values of the n $\beta$'s of such equations corresponding to the various values of $g$'s. The solution of the equations is, of course, a straight forward matter of algebra. Obviously the method is not so formidable as the above generalization may indicate, since the structures are usually few in number and relatively few points g need be considered for obtaining the desired indications of the values of $\beta$'s, which may be plotted on a map of the structure, as indicated in Figure 1.

As indicated above, the values of $\beta$ may be determined for a series of points extending along one conductor of a configuration containing only two conductors to be considered. The values of $\beta$ plotted in such a case will be informative, for example, as to the linear extent of the substantially affected portion of the first conductor, or as to other characteristics of the electrical conditions in the configuration. Under these conditions for each ground point $g$ the system of equations for the $\gamma$'s will reduce to $\gamma_{g1}=\beta_1$ or, in other words, the procedure outlined for determining a $\gamma$ results in direct determination of a value for $\beta$ corresponding to the particular ground point used. Determinations of $\beta$'s for a properly chosen series of ground points will give the necessary information.

A special use of this method is to determine how much boxing insulation may be required around an insulating joint already installed in a structure. In such a case the $\beta$ profile of the portion of the pipe line or structure on one side of the joint is compared with the $\beta$ profile of the portion on the other side of the joint. The curves which are obtained will show how far it may be necessary to box the line adjacent to the joint to protect it from corrosion. The line along which the measurements may be made in such a case is parallel to the jointed structure.

Particularly in the type of case just described, but also in more complicated cases, it may be desirable to plot along a surveyed line not $\beta$ but rather $\beta$ divided by the earth's resistivity in the vicinity of each point $g$. It will be noted from the first equation given above that the $\beta$'s relate potentials. On the other hand, the ratio of $\beta$ divided by the resistivity will give a much better indication of current densities than $\beta$. Plotting of the ratio is particularly indicated where the line surveyed, for example, runs through both marshy and dry areas or the like where considerable changes in resistivity will be present. It will sometimes be found that if resistivity is not taken into account, peculiar shapes of the $\beta$ curves may result. On the other hand, taking resistivities into account and plotting the ratio just mentioned, the curves will give true pictures of the conditions which exist. The resistivities may be determined in any conventional way.

Following determinations such as the above which, in practical cases will generally be used in conjunction with other determinations, as indicated in my above mentioned applications, decision may be made as to the probable best solution of the problem involved. The results may lead to an indication that conductive bonding may be desirable or perhaps that one of the structures should be opened, as described in my application Serial No. 93,141. If it appears that the latter is desirable, the effect of such opening before the opening is made may be determined in accordance with the procedure outlined in the last named application.

What I claim and desire to protect by Letters Patent is:

1. The method of determining electrical conditions in a configuration in which electrolysis is occurring including at least two structures, comprising providing a variable current source between said two structures, balancing the change of potential between one of said structures and another point in the configuration due to variation of said current against an adjustable fraction of the change of potential between the said structures due to the same variation of said current to thereby determine the ratio of simultaneous changes of said potentials, and repeating said balancing steps for at least one other point adjacent said structures while providing a variable current source between the same two structures.

2. The method of determining electrical conditions in a configuration in which electrolysis is occurring including at least two structures, comprising providing a variable current source between said two structures, determining the ratio of simultaneous changes, due to variations in the current source, of potentials between said two structures and between one of said structures and another point in the configuration, and repeating the last mentioned step for at least one other point adjacent said structures while providing a variable current source between the same two structures.

3. The method of determining electrical conditions in a configuration in which electrolysis is occurring including a plurality of grounded structures comprising providing a variable current source between two of said structures, balancing the change of potential between one of said structures and another point in the configuration due to variation of said current against an adjustable fraction of the change of potential between the said structures due to the same variation of said current to thereby determine the ratio of simultaneous changes of said potentials, repeating said balancing step for various points including the other structures of the configuration and a plurality of ground points adjacent said structures while providing a variable current source between the same two structures, and repeating the aforementioned steps while providing a variable current source between said one of said structures and other structures of the configuration, to thereby determine the values of coefficients relating said potentials to each other.

4. The method of determining electrical conditions in a configuration in which electrolysis is occurring including a plurality of grounded structures comprising providing a variable current source between two of said structures, determining the ratio of simultaneous changes, due to variations in the current source, of potentials between said structures and between one of said structures and another point in the configuration, repeating the last mentioned step for various points including the other structures of the configuration and a plurality of ground points adjacent said structures while providing a variable current source between the same two structures, and repeating the aforementioned steps while providing a variable current source between said one of said structures and the other structures of the configuration, to thereby determine the values of coefficients relating said potentials to each other.

5. In combination with a plurality of grounded structures in a configuration in which electrolysis is occurring, a variable direct current source connected between two of said structures, a potentiometer, the ends of which are connected to said two structures, and a direct current galvanometer and voltage adjustor connected between the variable point of said potentiometer and a third point in said configuration.

6. In combination with a plurality of grounded structures in a configuration in which electrolysis is occurring, a variable direct current source connected between two of said structures, a constant resistance potentiometer, the ends of which are connected to said two structures, and a direct current galvanometer connected between the variable point of said potentiometer and a third point in said configuration.

JOHN M. PEARSON.